(12) United States Patent
Deng et al.

(10) Patent No.: US 11,325,672 B2
(45) Date of Patent: May 10, 2022

(54) METHOD FOR CONTROLLING ELECTRIC SCOOTER AND ELECTRIC SCOOTER

(71) Applicant: Ninebot (Beijing) Tech Co., Ltd., Beijing (CN)

(72) Inventors: Shen Deng, Beijing (CN); Yubin Yuan, Beijng (CN); Weining Xi, Beijing (CN); Zichong Chen, Beijing (CN); Zhongyuan Chen, Beijing (CN)

(73) Assignee: Ninebot (Beijing) Tech Co., Ltd., Beijing (CN)

( * ) Notice: Subject to any disclaimer, the term of this patent is extended or adjusted under 35 U.S.C. 154(b) by 351 days.

(21) Appl. No.: 16/446,660

(22) Filed: Jun. 20, 2019

(65) Prior Publication Data

US 2020/0180558 A1 Jun. 11, 2020

(30) Foreign Application Priority Data

Dec. 7, 2018 (CN) .......................... 201811497140.9

(51) Int. Cl.
*B60R 25/21* (2013.01)
*B62J 45/41* (2020.01)
*B62H 5/08* (2006.01)

(52) U.S. Cl.
CPC .............. *B62J 45/41* (2020.02); *B60R 25/21* (2013.01); *B62H 5/08* (2013.01); *B62K 2202/00* (2013.01); *B62K 2204/00* (2013.01)

(58) Field of Classification Search
CPC ...... B60R 25/21; B62H 5/08; B62K 2202/00; B62K 2204/00
(Continued)

(56) References Cited

U.S. PATENT DOCUMENTS

2011/0307394 A1* 12/2011 Rzepecki ........... G06Q 30/0645
                                                                  705/307
2014/0265237 A1*  9/2014 Strother .................. B62H 3/00
                                                                  280/297
(Continued)

FOREIGN PATENT DOCUMENTS

CN         106683283 A      5/2017
CN         106815938 A      6/2017
(Continued)

OTHER PUBLICATIONS

Corresponding priority CN application search results.
Corresponding KR application search results.
Corresponding JP application search results.

*Primary Examiner* — James A Shriver, II
*Assistant Examiner* — Hilary L Johns
(74) *Attorney, Agent, or Firm* — Gang Yu (57) ABSTRACT

The present disclosure provides a method for controlling an electric scooter and electric scooter, wherein the method comprises: a first target operation performed on the electric scooter is detected in a case that the electric scooter is unlocked by using a target account; the electric scooter is set to be in a temporarily locked state in response to the first target operation, wherein the electric scooter in the temporarily locked state is set to allow to be unlocked only by the target account within a target duration after detecting the first target operation the electric scooter in the temporarily locked state is unlocked in a case that a second target operation performed on the electric scooter is detected within the target duration. The present disclosure solves the problem existed in the method for controlling an electric scooter in the related art that the electric scooter is easily used by others when the electric scooter is temporarily stopped using.

20 Claims, 2 Drawing Sheets

(58) Field of Classification Search
USPC .......................................................... 180/287
See application file for complete search history.

(56) References Cited

U.S. PATENT DOCUMENTS

| | | | |
|---|---|---|---|
| 2014/0309842 | A1 | 10/2014 | Jefferies et al. |
| 2016/0311334 | A1* | 10/2016 | Moravick ............... B60L 58/12 |
| 2017/0039631 | A1 | 2/2017 | Luke et al. |
| 2018/0319368 | A1 | 11/2018 | Keating et al. |
| 2019/0032729 | A1* | 1/2019 | Gao ......................... B62H 5/08 |

FOREIGN PATENT DOCUMENTS

| | | | |
|---|---|---|---|
| CN | 107240003 | A | 10/2017 |
| CN | 107316404 | A | 11/2017 |
| CN | 107481369 | A | 12/2017 |
| CN | 107609934 | A | 1/2018 |
| CN | 206991379 | U | 2/2018 |
| CN | 107767239 | A | 3/2018 |
| CN | 108282758 | A | 7/2018 |
| CN | 108305147 | A | 7/2018 |
| CN | 108394497 | A | 8/2018 |
| CN | 108394498 | A | 8/2018 |
| CN | 108399688 | A | 8/2018 |
| CN | 108629909 | A | 10/2018 |
| EP | 2437222 | A | 4/2012 |
| JP | 2003-072653 | A | 3/2003 |
| JP | 2004-116176 | A | 4/2004 |
| JP | 2014-113865 | A | 6/2014 |
| JP | 2016-199236 | A | 12/2016 |
| JP | 2017-169051 | A | 9/2017 |
| KR | 10-2013-0114372 | A | 10/2013 |
| WO | 2017217936 | A | 12/2017 |
| WO | 2018013094 | A | 1/2018 |

* cited by examiner

METHOD FOR CONTROLLING ELECTRIC SCOOTER AND ELECTRIC SCOOTER

TECHNICAL FIELD

The present disclosure relates to the field of communications, and in particular to a method for controlling an electric scooter and an electric scooter.

BACKGROUND

In the related art, when using a shared electric scooter, if the user needs some time (for example, a few minutes) to deal with something, and wants to continue to use the electric scooter after this time, the user needs to lock the electric scooter to end the previous stroke firstly, and then turn on the electric scooter to start a new stroke after the something are done.

However, in the period from the ending of the previous stroke to the start of the new stroke, the electric scooter may be unlocked and used by another user. If there are no other available electric scooters nearby, the user cannot start a new stroke. If the electric scooter is not locked, the electric scooter may be ridden by other users, causing a certain economy loss of the user. Meanwhile, if there are no other available electric scooters nearby, the user cannot start a new stroke.

It can be seen that the method for controlling an electric scooter in the related art exists a problem that the electric scooter is easily to be used by others when the electric scooter is temporarily stopped using.

SUMMARY

The embodiments of the present disclosure provide a method for controlling an electric scooter and an electric scooter, which can at least solve the problem existed in the method for controlling an electric scooter in the related art that the electric scooter is easily used by others when the electric scooter is temporarily stopped using.

According to an embodiment of the present disclosure, there is provided a method for controlling an electric scooter, which includes the following steps: detecting a first target operation performed on the electric scooter in a case that the electric scooter is unlocked by using a target account; setting the electric scooter to be in a temporarily locked state in response to the first target operation, wherein the electric scooter in the temporarily locked state is set to allow to be unlocked only by the target account within a target duration after detecting the first target operation; unlocking the electric scooter in the temporarily locked state in a case that a second target operation performed on the electric scooter is detected within the target duration, wherein the second target operation is used for instructing to unlock the electric scooter by using the target account.

Optionally, detecting the first target operation performed on the electric scooter comprises at least one of the followings: detecting a pressing operation performed on a temporary button on the electric scooter, wherein the temporary button is used for triggering to set the electric scooter to be in the temporarily locked state; detecting a first operation performed on a handlebar of the electric scooter, wherein the first operation comprises at least one of the followings: a folding operation, a retracting operation, and a pressing operation.

Optionally, detecting the second target operation performed on the electric scooter comprises: detecting a first input operation performed on the electric scooter within the target duration, wherein the first input operation is used for indicating to unlock the electric scooter in the temporarily locked state by using the target account.

Optionally, detecting the second target operation performed on the electric scooter further comprises: detecting a second operation performed on a handlebar of the electric scooter, wherein the second operation comprises at least one of the followings: a unfolding operation, a stretching operation, an uplifting operation.

Optionally, after setting the electric scooter to be in the temporarily locked state, determining first resource transfer information in a case that the electric scooter is in the temporary locked state, wherein the first resource transfer information is used for indicating a to-be-transferred resource in a first resource account associated with the target account, the to-be-transferred resource is a resource to be transferred to a second resource account associated with the electric scooter.

Optionally, determining the first resource transfer information comprises: determining that the first resource transfer information is first target information, wherein the first target information is used for indicating that the to-be-transferred resource is a first resource, the first resource is positively related to a first duration, and the first duration is a first time interval between a current time point and a first time point; the first time point is a time point of setting the electric scooter to be in the temporarily locked state.

Optionally, after setting the electric scooter to be in a temporarily locked state, sending prompt information through the electric scooter, wherein the prompt information is used for prompting the electric scooter to be in the temporarily locked state; stopping sending the prompt information through the electric scooter in a case that the second target operation performed on the electric scooter is detected within the target duration; or, stopping sending the prompt information through the electric scooter when the target duration arrives in a case that the second target operation performed on the electric scooter is detected within the target duration.

Optionally, after setting the electric scooter to be in the temporarily locked state, ending use of the electric scooter through the target account in a case that the second target operation performed on the electric scooter is not detected within the target duration.

Optionally, after ending the use of the electric scooter through the target account, transferring a first target resource in a first resource account associated with the target account to a second resource account associated with the electric scooter, wherein the first target resource comprises a second resource corresponding to the target duration.

Optionally, after unlocking the electric scooter in the temporarily locked state, detecting a third target operation performed on the electric scooter, wherein the third target operation is used for indicating to end use of the electric scooter through the target account.

Optionally, detecting the third target operation performed on the scooter comprises: detecting a third operation performed on a handlebar of the electric scooter, wherein the third operation comprises at least one of the followings: a folding operation, a retracting operation.

Optionally, after detecting the third target operation performed on the electric scooter, transferring a second target resource in a first resource account associated with the target account to a second resource account associated with the electric scooter, wherein the second target resource comprises a third resource that is positively related to a second duration, the second duration is a total duration of the electric scooter being in the temporary locking state within a second time interval between a second time point and a third time point, the second time point is a time point of unlocking the electric scooter by using the target account; the third time point is a time point of detecting the third target operation performed on the electric scooter.

Optionally, after detecting the third target operation performed on the electric scooter, detecting that the electric scooter is in a tilted position within a predetermined duration after the third target operation is detected; transferring a third target resource in a first resource account associated with the target account to a second resource account associated with the electric scooter, wherein the third target resource comprises a fourth resource corresponding to the detected tilted position.

Optionally, before detecting the first target operation performed on the electric scooter, detecting a second input operation of target biologic characteristic information performed on the electric scooter, wherein the target biologic characteristic information corresponds to the target account, the second input operation is used for indicating to unlock the electric scooter by using the target account; unlocking the electric scooter by using the target account in response to the second input operation.

According to another embodiment of the present disclosure, there is provided an electric scooter, which may comprise a memory and a processor: the memory stores a computer program, the computer program is configured to execute the following program modules when being executed by the processor: a first detecting module, configured to detect a first target operation performed on the electric scooter in a case that the electric scooter is unlocked by using a target account; a setting module, configured to set the electric scooter to be in a temporarily locked state in response to the first target operation, wherein the electric scooter in the temporarily locked state is set to allow to be unlocked only by the target account within a target duration after detecting the first target operation; an unlocking module, configured to unlock the electric scooter in the temporarily locked state in a case that a second target operation performed on the electric scooter is detected within the target duration, wherein the second target operation is used for instructing to unlock the electric scooter by using the target account.

Optionally, the first detection module comprises at least one of the followings: a first detecting unit, configured to detect a pressing operation performed on a temporary button on the electric scooter, wherein the temporary button is used for triggering to set the electric scooter to be in the temporarily locked state; a second detecting unit, configured to detect a first operation performed on a handlebar of the electric scooter, wherein the first operation comprises at least one of the followings: a folding operation, a retracting operation, and a pressing operation.

Optionally, the computer program is further configured to execute the following program module when being executed by the processor: a second detecting module, configured to detect a first input operation performed on the electric scooter within the target duration, wherein the first input operation is used for indicating to unlock the electric scooter in the temporarily locked state by using the target account.

Optionally, the computer program is further configured to execute the following program module when being executed by the processor: a third detecting module, configured to detect a second operation performed on a handlebar of the electric scooter, wherein the second operation comprises at least one of the followings: a unfolding operation, a stretching operation, an uplifting operation.

Optionally, the computer program is further configured to execute the following program module when being executed by the processor: a fourth detecting module, configured to, after unlocking the electric scooter in the temporarily locked state, detect a third target operation performed on the electric scooter, wherein the third operation comprises at least one of the followings: a folding operation, a retracting operation, the third operation is used for indicating to end use of the electric scooter through the target account.

According to another embodiment of the present disclosure, there is further provided a storage medium; the storage medium stores a computer program; and the computer program is configured to execute the steps of the abovementioned method embodiment in running.

According to another embodiment of the present disclosure, there is further provided an electronic apparatus, which includes a memory and a processor; the memory stores a computer program; and the processor is configured to run the computer program to execute the steps of the abovementioned method embodiment.

With the present disclosure, during the process of using the electric scooter with the target account, when a first target operation performed on the electric scooter is detected, the electric scooter is set to be in a temporarily locked state, so that the electric scooter is allowed to be unlocked only by the target account within the target duration, and the electric scooter cannot be unlocked by an account other than the target account, which ensures the use safety of the electric scooter within the target duration. Therefore, the problem existed in the method for controlling an electric scooter in the related art that the electric scooter is easily used by others when the electric scooter is temporarily stopped using is solved. The technical effects of improving the use safety of the electric scooter and improving the user experience are achieved.

BRIEF DESCRIPTION OF THE DRAWINGS

The accompanying drawings are described here to provide a further understanding of the present disclosure. The schematic embodiments and description of the present disclosure are adopted to explain the present disclosure, and do not form improper limits to the present disclosure. In the drawings.

DETAILED DESCRIPTION OF THE EMBODIMENTS

The present disclosure is described below with reference to the drawings and embodiments in detail. It should be noted that the embodiments of the present application and the characteristics of the embodiments may be combined with each other in a case where there is no conflict.

It is to be noted that, terminologies such as "first" and "second" in the specification, claims and accompanying drawings of the present disclosure are only used to distinguish similar objects, rather than to describe a special order or a precedence order.

Embodiment 1

Figure 1:
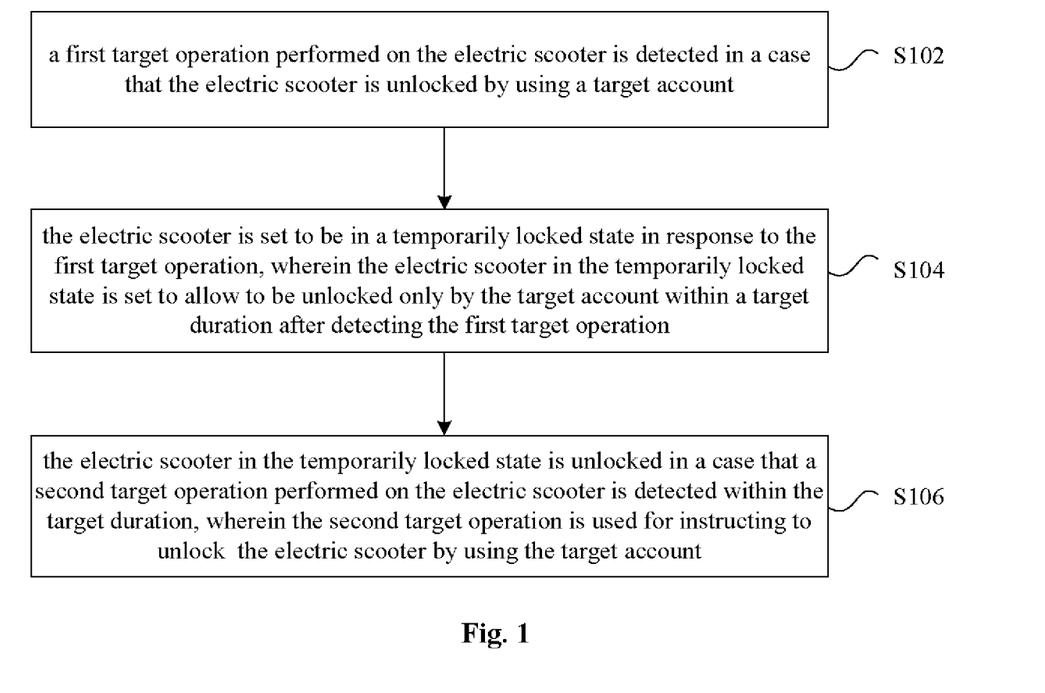
FIG. 1 illustrates a flowchart of a method for controlling an electric scooter according to an embodiment of the present disclosure.

The embodiment of the present disclosure provides a method for controlling an electric scooter. FIG. 1 illustrates a flowchart of a method for controlling an electric scooter according to an embodiment of the present disclosure. As illustrated in FIG. 1, the process includes the following steps:

At Step S102, a first target operation performed on the electric scooter is detected in a case that the electric scooter is unlocked by using a target account;

At Step S104, the electric scooter is set to be in a temporarily locked state in response to the first target operation, wherein the electric scooter in the temporarily locked state is set to allow to be unlocked only by the target account within a target duration after detecting the first target operation;

At Step S106, the electric scooter in the temporarily locked state is unlocked in a case that a second target operation performed on the electric scooter is detected within the target duration, wherein the second target operation is used for instructing to unlock the electric scooter by using the target account.

Through the above steps, a first target operation performed on the electric scooter is detected in a case that the electric scooter is unlocked by using a target account; the electric scooter is set to be in a temporarily locked state in response to the first target operation, wherein the electric scooter in the temporarily locked state is set to allow to be unlocked only by the target account within a target duration after detecting the first target operation; the electric scooter in the temporarily locked state is unlocked in a case that a second target operation performed on the electric scooter is detected within the target duration, wherein the second target operation is used for instructing to unlock the electric scooter by using the target account, which solves the problem existed in the method for controlling an electric scooter in the related art that the electric scooter is easily used by others when the electric scooter is temporarily stopped using.

At Step S102, a first target operation performed on the electric scooter is detected in a case that the electric scooter is unlocked by using a target account.

In the embodiment of the present disclosure, the electric scooter may be unlocked by using the target account firstly.

The control signal for unlocking the electric scooter may be sent by a server (e.g., cloud server) which controls the electric scooter. The control signal may be sent after the server receives a request message for requesting unlocking the electric scooter by using the target account.

Optionally, the request message may be sent to the server after the scanning of a graphic code (for example, a two-dimensional code) on the body of the electric scooter by using a mobile phone APP (Application, which is logged in by using the target account) is completed. After unlocking the electric scooter, the user can ride the electric scooter. After the ride ends, the user may lock the vehicle on the mobile phone APP to complete the scooter.

In the above process, the process of scanning the graphic code and locking the vehicle causes a waste of time. Moreover, the user's use of the vehicle has a high dependence on the mobile phone, and the vehicle cannot be used normally when the mobile phone is power-off or has no signal, thereby reducing user experience. Meanwhile, if the user forgets to lock the electric scooter through the mobile phone after the ride or cannot lock the electric scooter by the mobile phone due to some reasons (signal, power, etc) after arriving at the destination, others can ride the electric scooter, which will cause the user a certain amount of money loss.

In order to overcome the above problem caused by the mechanism for unlocking and locking the electric scooter by scanning a graphic code by using the mobile phone, in the embodiment of the present disclosure, a physical operation mechanism of unlocking and locking the electric scooter is added to the electric scooter to reduce the dependence of the control of the electric scooter on the mobile phone, and avoid the impact of controlling of the electric scooter due to sporadic situation in signal and power of the mobile phone.

In the embodiment of the present disclosure, the electric scooter can be unlocked by using the biometric characteristic information.

Optionally, before the first target operation performed on the electric scooter is detected, a second input operation of the target biometric characteristic information performed on the electric scooter is detected, wherein the target biometric characteristic information corresponds to the target account, the second input operation is used for indicating to unlock the electric scooter by using the target account; the electric scooter is unlocked by using the target account in response to the second input operation.

The target biometric characteristic information is used to uniquely identify a target account in a target application corresponding to the electric scooter. The target biometric information may include, but is not limited to, at least one of the followings: a fingerprint, an iris, a face.

A collecting device (for example, a camera, a fingerprint collector) for collecting biometric characteristic information may be provided on the electric scooter, and the collecting device may be disposed at any position of the electric scooter, for example, a handlebar (a left handlebar, a right handlebar, a middle handlebar), a handlebar stem, etc.

For example, a fingerprint identification module is added to the handlebar or the body of the shared electric scooter for identifying the user identity to unlock the electric scooter, so that the user does not need to open the mobile phone app to scan the two-dimensional code on the body of the electric scooter before each use.

When using the shared electric scooter for the first time, the user can download the target application, register the target account, use the target account to log in the target application, enter the target biometric characteristic information according to the prompt (entering through the mobile terminal, prompting to enter the target biometric characteristic information is an optional step), and upload the entered target biometric characteristic information to the server.

For example, the shared electric scooter has its own matching APP (target application), fingerprint registration is need during the first use, and the cloud server records fingerprint information.

After uploading the entered target biometric characteristic information to the server, the server stores the correspondence between the target biometric characteristic information and the target account. Thereafter, the user may not need to turn on the mobile phone when using the electric scooter. After finding the electric scooter, the user performs a second input operation of the target biometric characteristic information on the electric scooter. After detecting the second input operation, the electric scooter unlocks the electric scooter by using the target account in response to the second input operation.

The electric scooter can unlock the electric scooter by using the target account in the following way: the electric scooter sends the target biometric characteristic information to the server; the server performs account matching, determines to use the target account to unlock the electric scooter after finding the target account matching (corresponding to) the target biometric characteristic information, and sends a control signal for unlocking the electric scooter to instruct the electric scooter to perform an unlocking operation; after receiving the control signal, the electric scooter performs the unlocking operation.

Besides the externally visible handlebar, handlebar stem, body, wheels (the number can be set as needed, at least two), and various connecting components, the electric scooter may have a built-in motor, motor drive device, battery, and rear wheel mechanical lock. The electric scooter may also have an electronic lock.

After the electric scooter receives the control information, the electronic lock is released, and the mechanical lock is controlled to be opened, so as to complete the unlocking of the electronic scooter.

At Step S102, a first target operation performed on the electric scooter is detected in a case that the electric scooter is unlocked by using a target account. The first target operation may be used for triggering setting the electric scooter to be in a temporarily locked state.

In order to prevent the electric scooter from being used by others when temporarily placed, the electric scooter can be set to be in a temporarily locked state in which the electric scooter allow to be unlocked only by the target account within a target duration (for example, 5 min), and the electric scooter in the temporarily locked state allows to be unlocked only by the target account.

In order to reduce the dependence of the electric scooter on the mobile phone, a temporary button can be set on the electric scooter, wherein the temporary button is used for triggering setting the electric scooter to be in the temporarily locked state. The electric scooter can adopt a variable design of part parts: the handlebar can be in a folded form or in a telescopic form; the handlebar has a built-in telescopic trigger switch in the telescopic form, The handlebar stem may be in a telescopic form or in a folded form; in the folded form, the handlebar stem can be folded in two sections or in three sections. The folding telescopic module may be a potentiometer, a limit switch, a Hall sensor, or other sensor that detects the folding telescopic state.

The first target operation may include at least one of the followings: the pressing operation of the temporary button, the first operation performed on the handlebar of the electric scooter, and the first operation may include, but not be limited to, at least one of the followings: a folding operation (both ends of the handlebar are folded to the handlebar stem) and a retracting operation (both ends of the handlebar are retracted to the middle of the handlebar) and a pressing operation.

The electric scooter can be controlled to directly enter the temporary locked state by performing a press operation on the temporary button or performing a first operation on the handlebar, or the electric scooter can be controlled to directly enter the temporary locked state by successively performing the press operation on the temporary button and the first operation on the handlebar.

For example, the temporary button is pressed firstly and then the handlebar is folded to a predetermined position; or, the handlebar is folded to a predetermined position firstly and then the temporary button is pressed.

At Step S104, the electric scooter is set to be in a temporarily locked state in response to the first target operation, wherein the electric scooter in the temporarily locked state is set to allow to be unlocked only by the target account within a target duration after detecting the first target operation.

When the electric scooter is in the temporarily locked state, the electronic lock of the electric scooter is locked (the mechanical lock can be unlocked), and at this time, the electric scooter cannot be ridden by others and cannot be further locked.

Optionally, after setting the electric scooter to be in the temporarily locked state, the electric scooter may send prompt information through the electric scooter, wherein the prompt information is used for prompting the electric scooter to be in the temporarily locked state; the electric scooter may stop send the prompt information through the electric scooter in the case that the second target operation performed on the electric scooter is detected within the target duration; or, the electric scooter may stop send the prompt information through the electric scooter when the target duration arrives in the case that the second target operation performed on the electric scooter is not detected within the target duration.

When the electric scooter is in the temporarily locked state, the electric scooter may send prompt information to prompt the electric scooter to be in the temporarily locked state. When the second target operation is detected within the target duration, or when the second target operation is not detected until the target duration arrives, the electric scooter stops sending the prompt information (stops sending the prompt information when detecting the second target operation, or stops sending the prompt information when the target duration arrives). The above prompt information may be sent by means of an indicator lamp (for example, the indicator lamp is on, the indicator lamp is blinking, etc.).

Optionally, different charging modes may be adopted for the electric scooter in the temporarily locked state and the electric scooter in normal use.

In order to avoid insufficient account balance when returning the electric scooter, the electric scooter in the temporarily locked state can be charged (i.e., accounting resource transfer information) by means of real-time charging.

Optionally, after the electric scooter is set to be in the temporarily locked state, in the case that the electric scooter is in the temporarily locked state, first resource transfer information is determined, wherein the first resource transfer information is used for indicating a to-be-transferred resource in a first resource account associated with the target account; the to-be-transferred resource is a resource to be transferred to the second resource account associated with the electric scooter.

The first resource transfer information may be related to the number of times (the resource that needs to be transferred each time is the same) that the electric scooter is in the temporary lock state (pay-per-view), or may be related to the duration that the electric scooter is in the temporary lock state (charging by duration).

Optionally, determining the first resource transfer information comprises: determining that the first resource transfer information is first target information, where the first target information is used for indicating that the to-be-transferred resource is a first resource, the first resource is positively related to a first duration, the first duration is a first time interval between the current time point and a first time point, and the first time point is a time point of setting the electric scooter to be in a temporarily locked state.

Optionally, in the case that the second target operation performed on the electric scooter is not detected within the target duration, after the use of the electric scooter through the target account is ended, the first target resource in the first resource account associated with the target account may be transferred to the second resource account associated with the electric scooter. The first target resource includes a second resource, and the second resource corresponds to the target duration.

At Step S106, the electric scooter in the temporarily locked state is unlocked in a case that a second target operation performed on the electric scooter is detected within the target duration, wherein the second target operation is used for instructing to unlock the electric scooter by using the target account.

In order to ensure the validity of user's use of the vehicle resource (the electric scooter resource) and the rational utilization of the vehicle resource, a time limit (target duration) of the temporary locked state may be defined. When the second target operation performed on the electric scooter is detected within the time limited by the time limit, the electric scooter in the temporarily locked state is unlocked, wherein the second target operation is used for triggering to unlock the electric scooter in the temporarily locked state. In the case that the second target operation performed on the electric scooter is not detected within the target duration, the use of the electric scooter through the target account can be ended.

The second target operation can include a plurality of types. For example, the second target operation may be a first input operation corresponding to the target account. The first input operation may be an input operation of the target biometric characteristic information. After the first input operation is detected, an unlock operation is directly performed. At this time, if the handlebar of the electric scooter is in a folded state, a retracted state, or a downshifted state, the homing of the handlebar can be automatically controlled, or the handlebar can be manually homed by the user. For another example, the second target operation may also be a first input operation corresponding to the target account and a second operation performed on the handlebar of the electric scooter. After the first input operation is detected, the handlebar of the electric scooter is in an operable state, and the unlocking operation is performed only after the handlebar of the electric scooter is returned.

The second target operation is detected by the electric scooter, and the control of unlocking the electric scooter may be performed by the server, or by the electric scooter (the target biometric characteristic information corresponding to the target account is stored in the electric scooter).

Optionally, after unlocking the electric scooter in the temporarily locked state, a third target operation performed on the electric scooter is detected, wherein the third target operation is used for indicating to end the use of the electric scooter through the target account.

After unlocking the electric scooter in the temporarily locked state, the user can further return the electric scooter by performing a third target operation on the electric scooter, and end the use of the electric scooter.

In order to facilitate quick return the electric scooter and reduce the risk of an electric scooter falling, detecting a third target operation performed on the electric scooter includes: detecting a third operation performed on the handlebar of the electric scooter, wherein the third operation comprises at least one of the followings: a folding operation, a retracting operation. The center of gravity of the electric scooter is lowered by performing at least one of folding operation and retracting operation on the handlebar, thereby improving user experience.

Optionally, after detecting the third target operation performed on the electric scooter, the user may be charged for using the electric scooter: transferring a second target resource in the first resource account associated with the target account to a second resource account associated with the electric scooter, wherein the second target resource comprises a third resource, the third resource is positively related to a second duration, and the second duration is a total duration of the electric scooter being in the temporary locking state within a second time interval between a second time point and a third time point, the second time point is a time point of unlocking the electric scooter by using the target account, and the third time point is a time point of detecting the third target operation performed on the electric scooter.

In order to avoid the electric scooter falling over due to human factors, and thus causing damage to the electric scooter, it is possible to wait for a predetermined length of time after detecting the third target operation, and if the electric scooter falls over (in a tilted position) within the predetermined length of time, additional deduction can be made.

Optionally, after detecting the third target operation performed on the electric scooter, it is detected that the electric scooter is in a tilted position within a predetermined duration after detecting the third target operation; a third target resource in a first resource account associated with the target account is transferred to a second resource account associated with the electric scooter, wherein the third target resource comprises a fourth resource corresponding to the detected tilted position.

Based on the above technical solutions, during the process of using the electric scooter with the target account, when a first target operation performed on the electric scooter is detected, the electric scooter is set to be in a temporarily locked state, so that the electric scooter is allowed to be unlocked only by the target account within the target duration, and the electric scooter cannot be unlocked by an account other than the target account, which ensures the use safety of the electric scooter within the target duration. Therefore, the problem existed in the method for controlling an electric scooter in the related art that the electric scooter is easily used by others when the electric scooter is temporarily stopped using is solved. The technical effects of improving the use safety of the electric scooter and improving the user experience are achieved.

Figure 2:
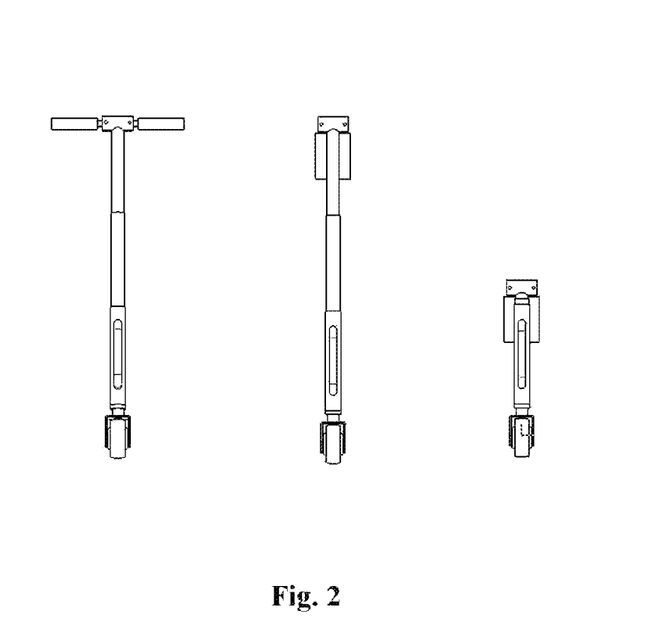
FIG. 2 illustrates a flowchart of a method for controlling an electric scooter according to a optional embodiment of the present disclosure.

A method for controlling an electric scooter mentioned above will be described in combination with the following optional embodiments. FIG. 2 illustrates a flowchart of a method for controlling an electric scooter according to a optional embodiment of the present disclosure. As illustrated in FIG. 2, the left and right handlebars of the electric scooter have a folding function, the handlebar stem has a up-and-down telescopic function, and the handlebar has a built-in folding telescopic recognition module (i.e., folding telescopic module). A fingerprint identification module is added to the handlebar or the vehicle body of the shared electric scooter to identify the user and unlock the electric scooter.

A shared electric scooter has a built-in motor, motor driving device, battery, and rear wheel mechanical lock. After handlebar stem of the electric scooter is retracted and folded, the rear wheel mechanical lock and the electronic lock synchronously lock the electric scooter. In the first use, it is necessary to register on the APP matching the shared electric scooter, and enter fingerprint information. The cloud server records the fingerprint information.

When the fingerprint recognition module recognizes the registered fingerprint information for the second time, the electronic lock of the electric scooter is unlocked; the central processor sends an instruction at the same time, and the mechanical lock is automatically opened. The user can pull up the handlebar of the electric scooter to an appropriate height and ride the electric scooter.

in the case that the handlebar is folded or retracted while the handlebar stem is still upright at the original height, the electric scooter is in a temporary locking state. The electronic lock of the electric scooter is locked, and the mechanical lock of the electric scooter is unlocked, so that it is convenient for the user to return to use the electric scooter after a short time. In the temporarily locked state, the handlebar stem cannot be retracted and folded, and the indicator lamp on the electric scooter indicates the temporarily locked state. Others cannot ride the electric scooter and the electric scooter cannot be further locked at this time. After returning, the user only needs to press the fingerprint recognition module again to continue to use the electric scooter. The temporarily locked state has a time limit. If the user does not return before the time limit is exceeded, a certain fee will be deducted, and the indicator light of the temporary locked state will be off. At this time, others can perform an unlocking riding function.

Optional Embodiment 1

When using the shared electric scooter for the first time, the user needs to download the APP, register new account and enter the user's fingerprint. Then, the user no longer needs to turn on the mobile phone when using the shared electric scooter. After a electric scooter is found, the fingerprint recognition module is pressed. The electronic lock and mechanical lock are unlocked, the handlebar stem is stretched to a certain height and the handlebar is unfolded, thus, the electric scooter can be ridden. After the ride is over, the handlebar is folded, the handlebar stem is retracted, the folding telescopic module is triggered, the electronic lock and the mechanical lock are locked, the billing is stopped, and the electric scooter is switched to the standby state to wait for the next user to use.

Optional Embodiment 2

When the customer rides the electric scooter to a certain place and needs a few minutes to deal with something, after the few minutes the customer needs to use the electric scooter continuously, the customer can just fold the handlebar without retracting the handlebar stem. In this case, the shared electric scooter is in a temporary lock waiting mode. The electric scooter is in a temporary lock state: the electronic lock is locked, and the mechanical lock is not locked, the handlebar stem cannot be retracted and folded, and the indicator light on the electric scooter indicates the temporarily locked state. At this time, others cannot ride the electric scooter, and the electric scooter cannot be further locked. After returning, the user only needs to press the fingerprint recognition module, and open the handlebar again, so that the electric scooter can be continuously used. The temporarily locked state has a time limit. If the user does not return before the time limit is exceeded, a certain fee will be deducted, and the indicator light of the temporary locked state will be off. At this time, others can perform an unlocking riding function.

Through the above description of the embodiment, those skilled in the art may clearly understand that the method according to the above embodiment may be implemented through software in connection with a necessary general hardware platform, or may be implemented by hardware. However, in many cases, the former is a better implementation. Based on this understanding, the technical solution of the embodiment of the present disclosure in essence or the part contributing to the prior art may be embodied in the form of a software product. The computer software product is stored in a storage medium (such as a ROM/RAM, a magnetic disc, an optical disc), including several instructions which may cause a terminal device (such as a mobile phone, a computer, a server, or a network device and the like) to execute the method according to the embodiments of the present disclosure.

Embodiment 2

Figure 3:
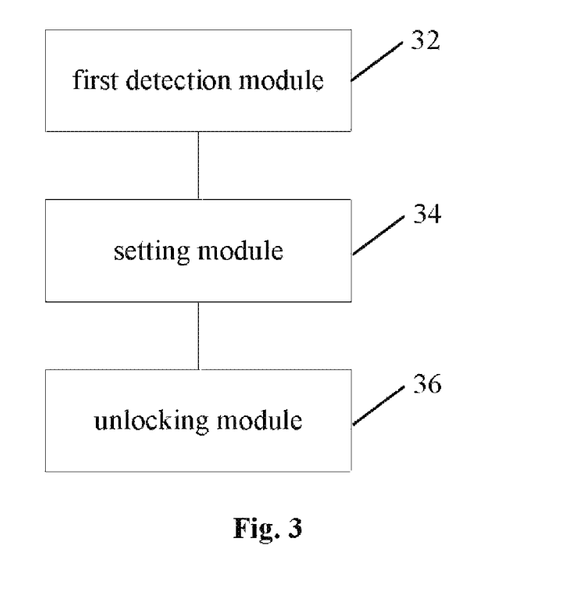
FIG. 3 illustrates a structural block diagram of an electric scooter according to an embodiment of the present disclosure.

The embodiments further provide an electric scooter, and the electric scooter is configured to implement the above embodiments and preferred implementation manners and the parts that have been described will no longer be repeated. As used herein, the term "module" is a combination of software and/or hardware capable of implementing a predetermined function. Although the apparatus described in the following embodiment is preferably implemented by software, it may also be conceivable to implement by hardware or a combination of the software and the hardware FIG. 3 illustrates a structural block diagram of an electric scooter according to an embodiment of the present disclosure. As illustrated in FIG. 3, the electric scooter comprises:

a first detecting module 32, configured to detect a first target operation performed on the electric scooter in a case that the electric scooter is unlocked by using a target account;

a setting module 34, connected to the first detecting module 32 and configured to set the electric scooter to be in a temporarily locked state in response to the first target operation, wherein the electric scooter in the temporarily locked state is set to allow to be unlocked only by the target account within a target duration after detecting the first target operation;

an unlocking module 36, connected to the setting module 34 and unlock the electric scooter in the temporarily locked state in a case that a second target operation performed on the electric scooter is detected within the target duration, wherein the second target operation is used for instructing to unlock the electric scooter by using the target account.

Optionally, the first detecting module 32 includes at least one of the followings:

a first detecting unit, configured to detect a pressing operation performed on a temporary button on the electric scooter, wherein the temporary button is used for triggering to set the electric scooter to be in the temporarily locked state;

a second detecting unit, configured to detect a first operation performed on a handlebar of the electric scooter, wherein the first operation comprises at least one of the followings: a folding operation, a retracting operation, and a pressing operation.

Optionally, the electric scooter further comprises: a second detecting module, detect a first input operation performed on the electric scooter within the target duration, wherein the first input operation is used for indicating to unlock the electric scooter in the temporarily locked state by using the target account.

Optionally, the electric scooter further comprises: a third detecting module, configured to detect a second operation performed on a handlebar of the electric scooter, wherein the second operation comprises at least one of the followings: a unfolding operation, a stretching operation, an uplifting operation.

Optionally, the electric scooter further comprises: a fourth detecting module, configured to, after unlocking the electric scooter in the temporarily locked state, detect a third target operation performed on the electric scooter, wherein the third operation comprises at least one of the followings: a folding operation, a retracting operation, the third operation is used for indicating to end use of the electric scooter through the target account.

It is to be noted that the above modules may be implemented via software or hardware, and for the latter, it may be implemented but not limited to the following manners: the above modules are located in a same processor; or the above modules are respectively located in different processors in any combined form.

Embodiment 3

The embodiment of the present disclosure further provides a storage medium; the storage medium stores a computer program, and the computer program is configured to execute the steps of the above-mentioned any method embodiment in running.

Optionally, in the present embodiment, the storage medium may be configured to store a computer program for executing the following steps:

S1, detecting a first target operation performed on the electric scooter in a case that the electric scooter is unlocked by using a target account;

S2, setting the electric scooter to be in a temporarily locked state in response to the first target operation, wherein the electric scooter in the temporarily locked state is set to allow to be unlocked only by the target account within a target duration after detecting the first target operation;

S3, unlocking the electric scooter in the temporarily locked state in a case that a second target operation performed on the electric scooter is detected within the target duration, wherein the second target operation is used for instructing to unlock the electric scooter by using the target account.

Optionally, in this embodiment, the above storage medium may include but not limited to: various media capable of storing the computer program such as a USB flash disk, a Read-Only Memory (abbreviated as ROM), a Random Access Memory (abbreviated as RAM), a mobile hard disk, a magnetic disk or an optical disk.

The embodiment of the present disclosure further provide an electronic apparatus, which includes a memory and a processor; the memory stores a computer program; and the processor is configured to run the computer program to execute the steps of the above-mentioned any method embodiment.

Optionally, the electronic apparatus may further include a transmission device and an input-output device, wherein the transmission device is connected with the processor, and the input-output device is connected with the processor.

Optionally, the specific examples in this embodiment may be referred to the examples described in the above embodiments and optional implementation manners, and will not be repeated here in this embodiment.

Obviously, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. Therefore, the present disclosure is not limited to any specific hardware and software combination.

The above is only the optional embodiment of the present disclosure and not intended to limit the scope of protection of the present disclosure. For those skilled in the art, the present disclosure may have various modifications and variations. Any modifications, equivalent replacements, improvements and the like made within the principle of the present disclosure shall fall within the scope of protection of the present disclosure.

What is claimed is:

1. A method for controlling an electric scooter, comprising:
   detecting a first target operation performed on the electric scooter in a case that the electric scooter is unlocked by using a target account;
   setting the electric scooter to be in a temporarily locked state in response to the first target operation, wherein the electric scooter in the temporarily locked state is set to allow to be unlocked only by the target account within a target duration after detecting the first target operation;
   unlocking the electric scooter in the temporarily locked state in a case that a second target operation performed on the electric scooter is detected within the target duration, wherein the second target operation is used for instructing to unlock the electric scooter by using the target account.

2. The method as claimed in claim 1, wherein detecting the first target operation performed on the electric scooter comprises at least one of the followings:
   detecting a pressing operation performed on a temporary button on the electric scooter, wherein the temporary button is used for triggering to set the electric scooter to be in the temporarily locked state;
   detecting a first operation performed on a handlebar of the electric scooter, wherein the first operation comprises at least one of the followings: a folding operation, a retracting operation, and a pressing operation.

3. The method as claimed in claim 1, wherein detecting the second target operation performed on the electric scooter comprises:
   detecting a first input operation performed on the electric scooter within the target duration, wherein the first input operation is used for indicating to unlock the electric scooter in the temporarily locked state by using the target account.

4. The method as claimed in claim 3, wherein detecting the second target operation performed on the electric scooter further comprises:

detecting a second operation performed on a handlebar of the electric scooter, wherein the second operation comprises at least one of the followings: a unfolding operation, a stretching operation, an uplifting operation.

5. The method according to claim 1, wherein after setting the electric scooter to be in the temporarily locked state, the method further comprises:
determining first resource transfer information in a case that the electric scooter is in the temporary locked state, wherein the first resource transfer information is used for indicating a to-be-transferred resource in a first resource account associated with the target account, the to-be-transferred resource is a resource to be transferred to a second resource account associated with the electric scooter.

6. The method as claimed in claim 5, wherein determining the first resource transfer information comprises:
determining that the first resource transfer information is first target information, wherein the first target information is used for indicating that the to-be-transferred resource is a first resource, the first resource is positively related to a first duration, and the first duration is a first time interval between a current time point and a first time point; the first time point is a time point of setting the electric scooter to be in the temporarily locked state.

7. The method as claimed in claim 1, wherein after setting the electric scooter to be in the temporarily locked state, the method further comprises:
ending use of the electric scooter through the target account in a case that the second target operation performed on the electric scooter is not detected within the target duration.

8. The method as claimed in claim 7, wherein after ending the use of the electric scooter through the target account, the method further comprises:
transferring a first target resource in a first resource account associated with the target account to a second resource account associated with the electric scooter, wherein the first target resource comprises a second resource corresponding to the target duration.

9. The method as claimed in claim 1, wherein after unlocking the electric scooter in the temporarily locked state, the method further comprises:
detecting a third target operation performed on the electric scooter, wherein the third target operation is used for indicating to end use of the electric scooter through the target account.

10. The method according to claim 9, wherein detecting the third target operation performed on the scooter comprises:
detecting a third operation performed on a handlebar of the electric scooter, wherein the third operation comprises at least one of the followings: a folding operation, a retracting operation.

11. The method as claimed in claim 9, wherein after detecting the third target operation performed on the electric scooter, the method further comprises:
transferring a second target resource in a first resource account associated with the target account to a second resource account associated with the electric scooter, wherein the second target resource comprises a third resource that is positively related to a second duration, the second duration is a total duration of the electric scooter being in the temporary locking state within a second time interval between a second time point and a third time point, the second time point is a time point of unlocking the electric scooter by using the target account; the third time point is a time point of detecting the third target operation performed on the electric scooter.

12. The method as claimed in claim 9, wherein after detecting the third target operation performed on the electric scooter, the method further comprises:
detecting that the electric scooter is in a tilted position within a predetermined duration after the third target operation is detected;
transferring a third target resource in a first resource account associated with the target account to a second resource account associated with the electric scooter, wherein the third target resource comprises a fourth resource corresponding to the detected tilted position.

13. The method as claimed in claim 1, wherein before detecting the first target operation performed on the electric scooter, the method further comprises:
detecting a second input operation of target biologic characteristic information performed on the electric scooter, wherein the target biologic characteristic information corresponds to the target account, the second input operation is used for indicating to unlock the electric scooter by using the target account;
unlocking the electric scooter by using the target account in response to the second input operation.

14. An electric scooter, comprising a memory and a processor, wherein the memory stores a computer program, the computer program is configured to execute the following program modules when being executed by the processor:
a first detecting module, configured to detect a first target operation performed on the electric scooter in a case that the electric scooter is unlocked by using a target account;
a setting module, configured to set the electric scooter to be in a temporarily locked state in response to the first target operation, wherein the electric scooter in the temporarily locked state is set to allow to be unlocked only by the target account within a target duration after detecting the first target operation;
an unlocking module, configured to unlock the electric scooter in the temporarily locked state in a case that a second target operation performed on the electric scooter is detected within the target duration, wherein the second target operation is used for instructing to unlock the electric scooter by using the target account.

15. The electric scooter as claimed in claim 14, wherein the first detection module comprises at least one of the followings:
a first detecting unit, configured to detect a pressing operation performed on a temporary button on the electric scooter, wherein the temporary button is used for triggering to set the electric scooter to be in the temporarily locked state;
a second detecting unit, configured to detect a first operation performed on a handlebar of the electric scooter, wherein the first operation comprises at least one of the followings: a folding operation, a retracting operation, and a pressing operation.

16. The electric scooter as claimed in claim 14, wherein the computer program is further configured to execute the following program module when being executed by the processor:
a second detecting module, configured to detect a first input operation performed on the electric scooter within the target duration, wherein the first input operation is used for indicating to unlock the electric scooter in the temporarily locked state by using the target account.

17. The electric scooter as claimed in claim 16, wherein the computer program is further configured to execute the following program module when being executed by the processor:
- a third detecting module, configured to detect a second operation performed on a handlebar of the electric scooter, wherein the second operation comprises at least one of the followings: a unfolding operation, a stretching operation, an uplifting operation.

18. The electric scooter as claimed in claim 14, wherein the computer program is further configured to execute the following program module when being executed by the processor:
- a fourth detecting module, configured to, after unlocking the electric scooter in the temporarily locked state, detect a third target operation performed on the electric scooter, wherein the third operation comprises at least one of the followings: a folding operation, a retracting operation, the third operation is used for indicating to end use of the electric scooter through the target account.

19. A storage medium, wherein the storage medium stores a computer program; and the computer program is configured to execute the method as claimed in claim 1 in running.

20. An electronic apparatus, wherein the electronic apparatus comprises a memory and a processor, the memory stores a computer program, and the processor is configured to run the computer program to execute the method as claimed in claim 1 in running.

* * * * *